April 21, 1931.  C. J. LEISY  1,802,117
ADJUSTABLE CONTROL PEDAL
Filed Sept. 29, 1927
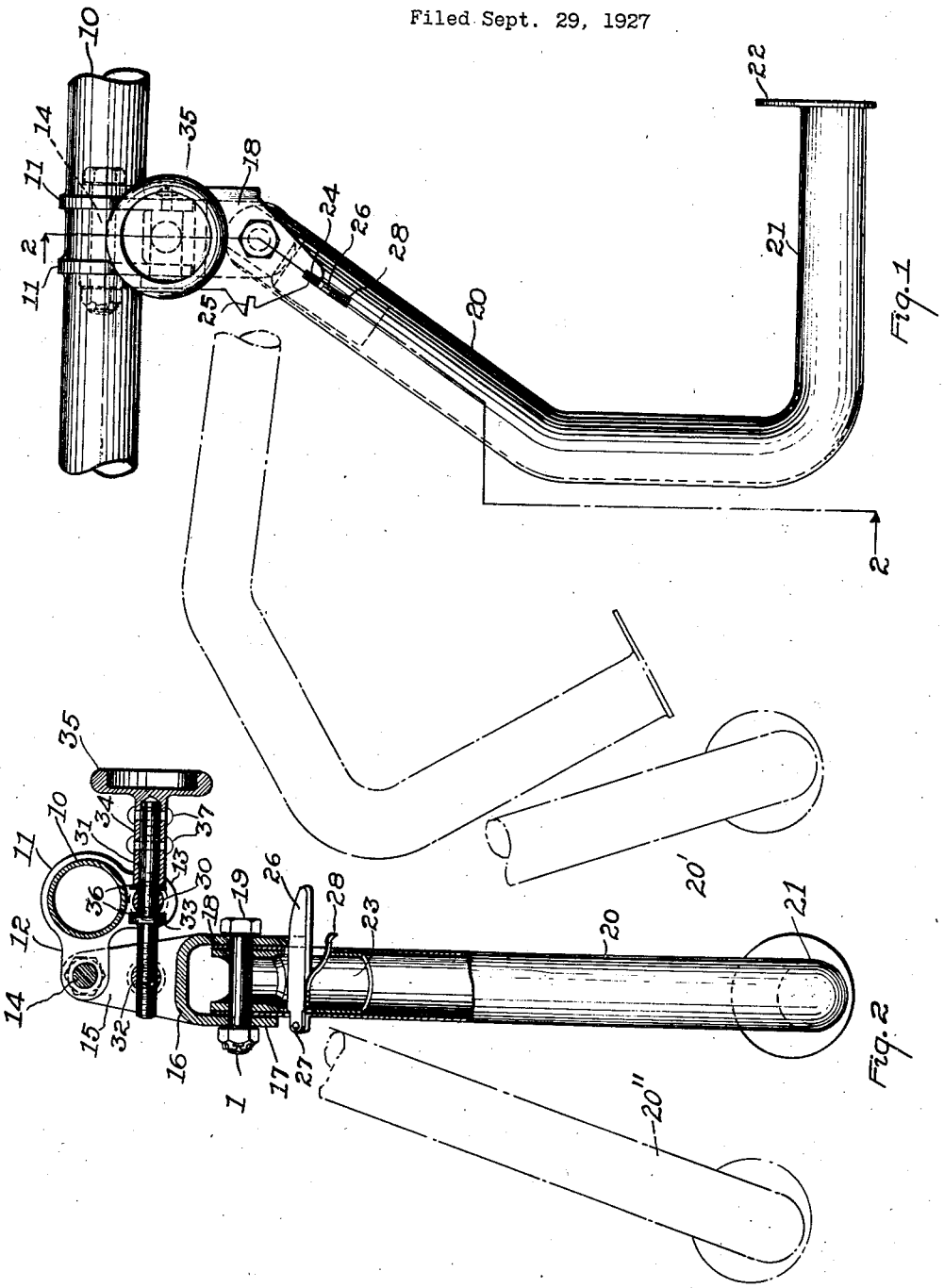
INVENTOR
Clifford J. Leisy
BY
Kwis, Hudson & Kent
ATTORNEYS Patented Apr. 21, 1931

1,802,117

UNITED STATES PATENT OFFICE

CLIFFORD J. LEISY, OF CLEVELAND, OHIO, ASSIGNOR TO THE GLENN L. MARTIN COMPANY, OF CLEVELAND, OHIO, A CORPORATION OF OHIO

ADJUSTABLE CONTROL PEDAL

Application filed September 29, 1927. Serial No. 222,738.

This invention relates to improvements in airplanes, and has reference particularly to the pedals by means of which the rudder movements are ordinarily controlled, but is adaptable for control pedals in airplanes generally, whatever their use.

The adjustment of pedals to fit pilots of different height and leg-reach is not an unknown feature in modern airplanes, but so far as I am aware the means for accomplishing this adjustment has heretofore been located at the pedals themselves and consequently has been difficult to manipulate.

One of the objects of my invention, therefore, is the provision of a pedal adjusting means within easy reach of the pilot, and one which may be operated with facility while the plane is in flight.

Another object is the provision of a pedal lever adjustment by which an increased torque is obtained when the pedal is adjusted forwardly from the pilot.

Another object is the provision of means for moving control pedals to an inoperative position in order to provide additional leg room for the occupant of the seat behind the pedals. In airplanes there is sometimes a provision for dual control, incorporating two sets of rudder control pedals. It is in such planes that this latter provision is particularly desirable as giving the occupant not piloting the plane room for other activities.

Other objects and features of novelty will appear as I proceed with the description of that embodiment of the invention which, for the purposes of the present application, I have illustrated in the accompanying drawing, in which—

Fig. 1 is an elevation of a pedal and a fragment of the corresponding torque tube as viewed from the rear thereof, the pedal being shown in inoperative position in dot and dash lines; and Fig. 2 is a side elevation partly in section upon the line 2—2 of Fig. 1, and indicating three different positions of adjustment.

In the drawing a horizontal torque tube, such as is commonly mounted in air planes slightly below the instrument board, is indicated at 10. Upon this tube are mounted a pair of spaced rings 11 which may be welded or otherwise secured to the tube. Each of these rings has a rearwardly extending lip 12 and a downwardly extending lip 13. The two lips 12 are connected by a bolt 14 which extends beyond the lips where it supports pivotally the upstanding arms 15 of a bracket 16. At right angles to the arms 15 the bracket 16 has a pair of downwardly extending legs 17 and 18, which are perforated to carry a bolt 19 at right angles to the bolt 14.

The bolt 19 pivotally supports the outer portion of the pedal crank and pedal which, in the form illustrated herein, are built of a single piece of tubing. The crank portion 20 of the tubing is angularly bent, as shown in Fig. 1, in order to bring the pedal 21 substantially in line with the bracket 16. The outer end of the tube is flanged as shown at 22, thereby providing a guard to prevent the pilot's foot from slipping off the pedal.

The tubular part 20 of the crank is reinforced at its upper end by an internal sleeve 23 welded thereto, preferably of a somewhat heavier gauge metal than the tubular part 20, where these parts are perforated to receive the bolt 19 by means of which the main portion of the crank is pivotally mounted upon the bracket portion 16. The leg 18 of the bracket has formed therein a pair of notches 24 and 25 that are adapted to receive a latch 26 which is pivoted at 27 to a lip struck up out of the metal of the crank. The latch 26 extends diametrically across the tube and protrudes through a slot in the latter so as to afford a handle by means of which it may be pushed out of the notch 24 or 25, as the case may be, against the action of a leaf spring 28 attached to the latch and bearing against the lower end of the latch slot to normally hold the latch in latching position.

Between the lips 13 depending from the torque tube 10 I mount a trunnion or pivot 30 through which extends a smooth perforation constituting a bearing for a rotatable shaft 31. A second trunnion or pivot 32, mounted in the arms 15 of the bracket, has a threaded perforation into which is screwed the threaded extremity of shaft 31. Longitudinal movement of this shaft, with respect to the pivot 30, is prevented by a shoulder 33 on the shaft on one side of the pivot and by a tubular extension 34 of the hub of a hand wheel 35 on the other side, washers 36 being interposed if desired. The hand wheel 35 may be secured to the shaft 31 by rivets 37 or other suitable means.

When the pilot of an airplane equipped with my invention finds the pedals set in a position, such as not to be entirely comfortable, he grasps the hand wheel 35 and turns it to the right, if he desires shorter leg reach, or to the left if longer reach is required, performing the same operation, of course, upon both pedals. By this means the cranks may be swung to any desired position within the limits of their movement, as for instance to the positions shown in dot and dash lines in Fig. 2, thus varying the positions of the pedals without varying the angular position of the torque tube 10. In order to keep the perforations in the pivots 30 and 32 in alignment the pivots must turn in their supports as the adjustment of the pedal is changed.

Three positions of pedal lever 20 are shown in Fig. 2. Adjustment of the pedal to position 20″ not only changes its position from 20′ in relation to the pilot but it also increases the torque relation of pedal 20 to shaft 10, an action which is due to the progressively increasing length of the pedal arm when it is adjusted from position 20′ to 20″ by an amount proportionate to the lever arm 12, to thus provide increased torque in an extended leg position thereby reducing the physical effort required to operate the controls associated with shaft 10.

In case it is desired to clear the cockpit in front of the seat as much as possible, as when the occupant of the seat is not engaged in piloting the plane, the free end of latch 26 is pushed downwardly so as to be withdrawn from the slot 24 and the crank is swung upwardly about the bolt 19 to the position shown in dot and dash lines of Fig. 1, whereupon the latch snaps into engagement with the notch and the crank and pedal are releasably secured in that position.

Having thus described my invention, I claim:

1. In a device of the class described, a horizontal torque tube, a pedal crank pivotally supported by said torque tube, two pivots parallel to the pivot of said crank and eccentrically located with respect to the same, one on the tube and one on the crank, and adjustable means for holding said last named pivots at fixed distances apart.

2. In a device of the class described, a horizontal torque tube, a pedal crank mounted thereon for oscillating said tube, a pedal on said crank, said crank comprising a pivot joint near said torque tube adapted to permit the outer portion of the crank to be swung in the plane common to the pedal and tube.

3. In a device of the class described, a horizontal torque tube, a pedal crank mounted thereon for oscillating said tube, a pedal on said crank, said crank comprising a pivot joint near said torque tube adapted to permit the outer portion of the crank to be swung in the plane common to the pedal and tube, and means for locking the outer portion of the crank to the inner portion in retracted position.

4. In a device of the class described, a horizontal torque tube, a pedal crank mounted thereon for oscillating said tube, a pedal on said crank, said crank comprising a pivot joint near said torque tube adapted to permit the outer portion of the crank to be swung in the plane common to the pedal and tube, and a retractable spring latch for automatically locking the outer portion of the crank to the inner portion in either operative or inoperative position when the crank is moved to that position.

5. In a device of the class described, a torque tube; a horizontal lever arm attached to said tube; a horizontal pedal crank pivotally connected to said lever at a fixed distance from the diametral center of said tube in perpendicular relation; two pivots parallel to the pivot of said crank, one in fixed position with respect to said tube and the other in fixed position with respect to said crank; adjusting means associated with said pivots for varying the torque relation of said pedal to said tube.

6. In a device of the class described, a horizontal torque tube, a pedal crank pivotably supported by said torque tube, two pivots parallel to the pivot of said crank and eccentrically located with respect to the same, one on the tube and one on the crank, and continuously variable adjustment means for holding said pivots at fixed distances apart.

7. In a device of the class described, a horizontal torque tube; a lever attached to said tube in a substantially horizontal angular relation; a pedal crank pivotally attached to said lever in a substantially vertical relation; a pedal attached to said pedal crank; adjustable means for locking said lever and said pedal crank together in various eccentric radial relations of said pedal to said shaft.

8. In a device of the class described, a horizontal torque tube; a lever attached to said tube in a substantially horizontal angular relation; a downwardly projecting pedal crank pivotally attached to said lever; adjustable means for locking said lever and said pedal crank together in various eccentrically radial relations below said tube.

9. In a device of the class described, a horizontal torque tube; a lever attached to said tube in a substantially horizontal angular relation; a pedal crank pivotally attached to said lever; a downwardly projecting lever attached to said tube adjacent said horizontal lever; adjustable means for locking said pedal crank to said levers in various eccentric radial relations to said tube, said means comprising a threaded shaft pivotally mounted on said downwardly projecting lever and fixed against relative longitudinal movement, a member pivoted to said pedal crank and through which said threaded shaft is longitudinally adjustable, means for manually revolving said shaft.

In testimony whereof I hereunto affix my signature.

CLIFFORD J. LEISY.